(12) United States Patent
Burla et al.

(10) Patent No.: US 11,764,873 B2
(45) Date of Patent: Sep. 19, 2023

(54) ELECTRONIC DEVICE FOR CONVERTING A WIRELESS SIGNAL INTO AT LEAST ONE MODULATED OPTICAL SIGNAL

(71) Applicant: ETH ZURICH, Zurich (CH)

(72) Inventors: Maurizio Burla, Zurich (CH); Juerg Leuthold, Neerach (CH)

(73) Assignee: ETH ZURICH, Zurich (CH)

( * ) Notice: Subject to any disclaimer, the term of this patent is extended or adjusted under 35 U.S.C. 154(b) by 47 days.

(21) Appl. No.: 17/413,049

(22) PCT Filed: Dec. 17, 2019

(86) PCT No.: PCT/EP2019/085511
§ 371 (c)(1),
(2) Date: Jun. 11, 2021

(87) PCT Pub. No.: WO2020/127170
PCT Pub. Date: Jun. 25, 2020

(65) Prior Publication Data
US 2022/0052760 A1      Feb. 17, 2022

(30) Foreign Application Priority Data

Dec. 20, 2018   (CH) ..................................... 01578/18

(51) Int. Cl.
*H04B 10/2575*    (2013.01)
*H04B 10/80*      (2013.01)
(52) U.S. Cl.
CPC . *H04B 10/25759* (2013.01); *H04B 10/25751* (2013.01); *H04B 10/801* (2013.01)
(58) Field of Classification Search
CPC ........ H04B 10/25759; H04B 10/25751; H04B 10/801

(Continued)

(56) References Cited

U.S. PATENT DOCUMENTS 10,534,110 B2 *    1/2020   Tennant .................... H01Q 5/22
10,996,379 B2 *    5/2021   Jornet ...................... G02B 5/008
(Continued)

OTHER PUBLICATIONS

Of Harter et al; Silicon-plasmonic integrated circuits for terahertz signal generation and coherent detection; 2018; Karlsruhe Institute of Technology; pp. 1-17. (Year: 2018).*

(Continued)

*Primary Examiner* — Amritbir K Sandhu
(74) *Attorney, Agent, or Firm* — Quantum Patent Law Firm; Seongyoune Kang

(57) ABSTRACT

Disclosed is an electronic device (1) for converting a wireless signal (2) in the mm-wave or sub-THz range into at least one modulated optical signal (16). The electronic device (1) comprises an antenna element (11) for converting the wireless signal (2) into a guided electrical signal (12), wherein the antenna element (11) is arranged on a printed circuit board (10b') or on a first integrated chip (10'). The electronic device (1) comprises an electrical signal converter (13) for converting the at least one guided electrical signal (12) into a conditioned electrical signal (14), wherein the electrical signal converter (13) is arranged on a second integrated chip (10"). The electronic device (1) comprises a modulator (15) for converting the conditioned electrical signal (14) into the modulated optical signal (16), wherein the modulator (15) is arranged on a third integrated chip (10'''), and wherein the modulator (15) comprises a waveguide (151) and a cladding (152) comprising a first cladding portion (1521) having a conductive material at an interface with the waveguide (151) and a second cladding portion (1522) having a conductive material at an interface with the waveguide (151).

22 Claims, 6 Drawing Sheets

(58) Field of Classification Search
USPC .......................................................... 398/115
See application file for complete search history.

(56) References Cited

U.S. PATENT DOCUMENTS

| | | | |
|---|---|---|---|
| 2010/0303476 A1* | 12/2010 | Barton | H04B 10/6151 |
| | | | 359/489.08 |
| 2016/0323041 A1* | 11/2016 | Akyildiz | H04B 10/90 |
| 2018/0081204 A1* | 3/2018 | Ma | G02F 1/0027 |
| 2018/0102847 A1* | 4/2018 | Kim | G02F 1/025 |

OTHER PUBLICATIONS

Ummethala et al; THz-to-Optical Conversion in Wireless Communications Using an Ultra-Broadband Plasmonic Modulator ; 2018; Karlsruhe Institute of Technology; pp. 1-17. (Year: 2018).*

Harter et al; Silicon-plasmonic integrated circuits for terahertz signal generation and coherent detection; 2018; Karlsruhe Institute of Technology; pp. 1-17. (Year: 2018).*

Hu et al; Electrically Triggered Tunable Terahertz Band-Pass filter based on VO2Hybrid Metamaterial; 2018; pp. 1-7. (Year: 2018).*

Viktoriia et al; Ultra-compact modulators based on novel CMOS-compatible plasmonic materials; 2013; Technical University of Denmark; pp. 1-10. (Year: 2013).*

* cited by examiner

ELECTRONIC DEVICE FOR CONVERTING A WIRELESS SIGNAL INTO AT LEAST ONE MODULATED OPTICAL SIGNAL

CROSS-REFERENCE TO RELATED APPLICATIONS

This patent application is the U.S. national stage application of International Application No. PCT/EP2019/085511, filed Dec. 17, 2019, and the entire contents of which are incorporated herein by reference, which claims priority to Swiss Application No. 01578/18, filed Dec. 20, 2018, and the entire contents of which are incorporated herein by reference.

FIELD OF THE INVENTION

The present disclosure relates to an electronic device for converting a wireless signal into at least one modulated optical signal. More particularly, the present disclosure relates to an electronic device for converting a wireless signal in the mm wave or sub-THz range into at least one modulated optical signal.

BACKGROUND ART

Conversion of a wireless signal into at least one modulated optical signal is required in many applications. A wireless signal in the range from 30 MHz-30 GHz belongs to the class of microwaves. A wireless signal in the range from 30 GHz-300 GHz belongs to the class of millimetre waves respectively mm waves. A wireless signal in the range from 300 GHz-1 THz belongs to the class of sub-THz waves respectively to the sub-THz range.

The receiver may convert the wireless signal into an electrical signal and convert the electrical signal into at least one modulated optical signal. Ideally, a broad frequency range may be covered and low conversion loss may be achieved using a compact and inexpensive device. In the prior art, employed are expensive III-V technologies, relying on a high cost substrates and a limited maximum wafer size, discrete components and antennas, which have disadvantages as regards compactness, cost, conversion loss and frequency range.

WO2016154764 discloses an electro-optic element with a first waveguide which is a plasmonic waveguide comprising: a first core comprising a ferroelectric material; and a cladding comprising a first cladding portion comprising, at a first interface with the ferroelectric material, a first cladding material having a permittivity having a negative real part; the element comprising a first and a second electrode for producing an electric field in the ferroelectric material when a voltage is applied between the first and second electrodes, for modulating at least a real part of a refractive index of the ferroelectric material. The element comprises, in addition, a crystalline substrate on which the ferroelectric material is epitaxially grown with zero or one or more intermediate layers present between the substrate and the ferroelectric material. The element may comprise a second waveguide which is a photonic waveguide comprising a second core positioned in proximity to the first waveguide for enabling evanescent coupling between the first and second waveguides.

Y. N. Wijayanto, H. Murata and Y. Okamura, "Electrooptic Millimeter-Wave-Lightwave Signal Converters Suspended to Gap-Embedded Patch Antennas on Low-$k$ Dielectric Materials," in IEEE Journal of Selected Topics in Quantum Electronics, vol. 19, no. 6, pp. 33-41, November-December 2013, doi: 10.1109/JSTQE.2013.2265192 discloses an in integration of a receiving antenna and a modulator in a single chip. However the conversion is strongly limited in terms of high loss; in terms of speed by the bandwidth of the modulator; the low nonlinear coefficient requires a large structure (cm-scale), therefore with high bulk and fabrication cost.

Y. Salamin, et al. "Direct conversion of free space millimeter waves to optical domain by plasmonic modulator antenna." Nano letters 15.12 (2015): 8342-8346, discloses a compact structure operating at high frequency (60 GHz); however the structure does not allow high conversion efficiency.

U.S. Pat. No. 5,331,453A discloses an antenna/receiver device including a slow-wave antenna for receiving RF signals. The antenna has a pair of terminals for providing odd-mode antenna excitation of the antenna. A differential-input circuit is connected to the antenna terminals for providing odd-mode, anti-phase current excitation of the terminals and for amplifying the RF signals. A processing circuit is provided for operating on the RF signals and generating an output signal from the RF signals. An optical transducer optically couples the output signal out of the antenna/receiver device. In one embodiment of the invention, the processing circuit comprises a mixing circuit means for mixing the RF signals with a local oscillator signal for generating an intermediate frequency output signal. In an alternate embodiment, the processing circuit comprises a detector for detecting video information contained in the RF signals.

S. Ummethala et al., "THz-to-Optical Conversion in Wireless Communications Using an Ultra-Broadband Plasmonic Modulator" arXiv:1812.04121 [physics.app-ph], discloses a THz to optical conversion using an antenna, a THz amplifier and a plasmonic Mach-Zehnder modulator. The THz data signal is received by an antenna, amplified by a THz amplifier, and then fed to a plasmonic Mach-Zehnder modulator for modulation onto a carrier at optical frequency.

DISCLOSURE OF THE INVENTION

There may be a need for an improved electronic device for converting a wireless signal into at least one modulated optical signal. More particularly, there may be a need for a compact, inexpensive electronic device for converting a wireless signal in the mm wave or sub-THz range into at least one modulated optical signal. More particularly, there may be a need for an electronic device for converting a wireless signal in the mm wave or sub-THz range into at least one modulated optical signal having low conversion loss and broad frequency performance.

Such a need may be met with the subject-matter of the independent claims. Advantageous embodiments are defined in the dependent claims.

Ideas underlying embodiments of the present invention may be interpreted as being based, inter alia, on the following observations and recognitions.

An aspect of the invention relates to an electronic device for converting a wireless signal in the mm-wave or sub-THz range into at least one modulated optical signal. The electronic device comprises at least one antenna element for receiving the wireless signal and for converting the wireless signal into at least one guided electrical signal, wherein the at least one antenna element is arranged on a printed circuit board or on a first integrated chip;

an electrical signal converter for receiving the at least one guided electrical signal and for converting the at least one guided electrical signal into at least one conditioned electrical signal, wherein the electrical signal converter is arranged on a second integrated chip; and at least one modulator for receiving the at least one conditioned electrical signal and for converting the at least one conditioned electrical signal into the at least one modulated optical signal, wherein the at least one modulator is arranged on a third integrated chip, wherein the at least one modulator comprises a waveguide, wherein the at least one modulator comprises a cladding, wherein the cladding comprises a first cladding portion having a conductive material at an interface with the waveguide, and wherein the cladding comprises a second cladding portion having a conductive material at an interface with the waveguide. Thus, the electronic device comprises a signal converter and a modulator each arranged on an integrated chip which enables a compact, inexpensive device having low conversion loss and broad frequency performance. Depending on the specific needs, an antenna is arranged on a printed circuit board or an integrated chip which enables further improvements as regards compactness and costs or as regards reduced conversion loss and improved frequency performance.

In some embodiments, the at least one antenna element includes a number N of different antenna elements, wherein each one of the N antenna elements converts the wireless signal into a guided electrical signal, wherein the at least one guided electrical signal includes a number N of guided electrical signals.

In some embodiments, the at least one conditioned electrical signal includes a number M of conditioned electrical signals.

In some embodiments, the at least one optical modulator includes a number M of modulators and the at least one modulated optical signal includes a number M of modulated optical signals.

In some embodiments, the electronic device further comprises an optical signal converter configured to combine at least two of the number M of modulated optical signals and/or to delay/filter one or more of the number M of modulated optical signals.

In some embodiments, the electrical signal converter is configured to combine at least two of the number N of guided electrical signals and/or to delay one or more of the number N of guided electrical signals.

In some embodiments, the electrical signal converter comprises one or more of an electrical amplifier and an electrical filter.

In some embodiments, the electrical signal converter comprises a frequency converter, wherein the at least one guided electrical signal has a first frequency, and wherein one or more conditioned electrical signals of the at least one conditioned electrical signal has a second frequency different from the first frequency.

In some embodiments, the waveguide of the at least one modulator includes a core comprising a nonlinear material, in particular one or more of a ferroelectric material and a polymer material.

In some embodiments, the electronic device further comprises an optical interface for receiving and transmitting an externally generated optical signal to the at least one modulator.

In some embodiments, two or more of the first, second and third integrated chip are included in a monolithically integrated single chip, in particular based on a monolithic integration including one of: epitaxial growth, wafer bonding, or flip-chip bonding.

In some embodiments, the third integrated chip includes a substrate having one or more substrate layers, and wherein the waveguide is located on one of the substrate layers and attached to it.

In some embodiments, the monolithically integrated single chip includes a substrate having two or more substrate layers, wherein the antenna elements and the electrical signal converter are located in a first substrate layer, and wherein the at least one modulator is located in a second substrate layer.

In some embodiments, the first cladding portion is spaced apart from the second cladding portion and arranged on one side of the waveguide.

In some embodiments, the first cladding portion and the second cladding portion are arranged on opposite sides of the waveguide.

In some embodiments, the cladding includes a third cladding portion and a fourth cladding portion, wherein the third and fourth cladding portions are arranged on opposite sides of the waveguide, and wherein the waveguide and the third and fourth cladding portions are arranged between the first and second cladding portion.

In some embodiments, a spacer layer is arranged between the waveguide and the first and/or the second cladding portion.

In some embodiments, one or more of the first, second and third integrated chip or the monolithically integrated single chip is/are enclosed in a microchip package.

A further aspect of the invention relates to a method of converting a wireless signal in the mm-wave or sub-THz range into at least one modulated optical signal, wherein an electronic device according to an embodiment as described above is provided. The method comprises: receiving and converting via at least one antenna element of the electronic device the wireless signal into at least one guided electrical signal; receiving and converting via a signal converter of the electronic device the at least one guided electrical signal into at least one conditioned electrical signal; and receiving and converting via a modulator of the electronic device the conditioned electrical signal into the modulated optical signal.

A further aspect of the invention relates to a method of manufacturing an electronic device for converting a wireless signal in the mm-wave or sub-THz range into at least one modulated optical signal according to some embodiments as described above. The method comprises: providing a printed circuit board or a first integrated chip having arranged the at least one antenna element; providing a second integrated chip having arranged the electrical signal convertor; providing a third integrated chip having arranged the at least one modulator; interconnecting via first electrical lines the printed circuit board or the first integrated chip with the second integrated chip and interconnecting via second electrical lines the second integrated chip with the third integrated chip.

BRIEF DESCRIPTION OF THE DRAWINGS

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

MODE(S) FOR CARRYING OUT THE INVENTION

Figure 1A:
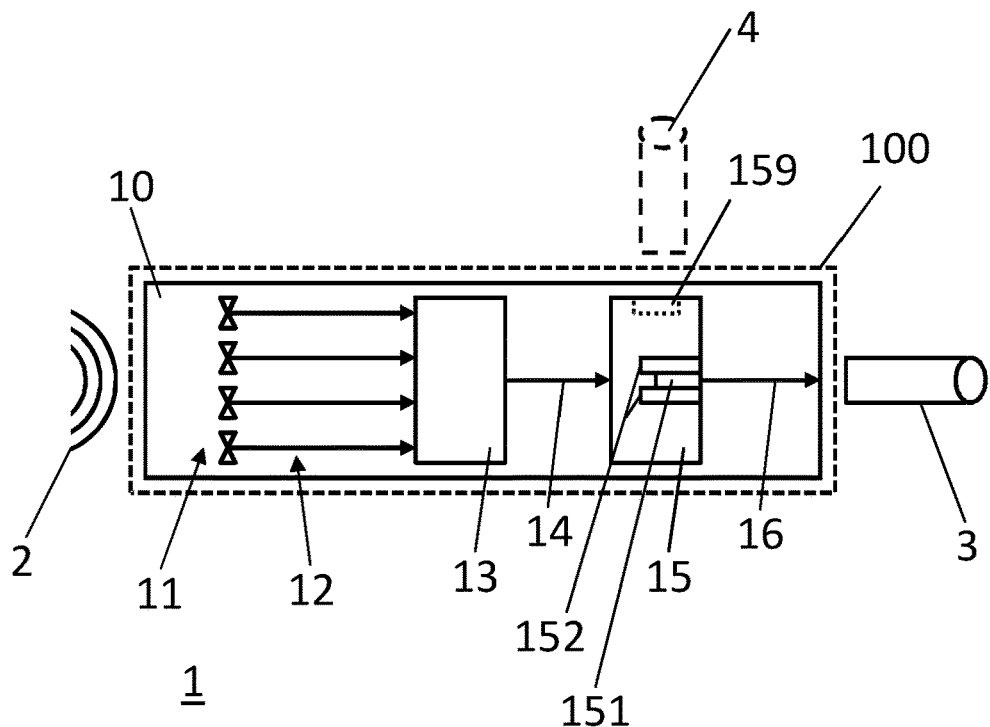
FIG. 1a schematically illustrates a first embodiment of an electronic device for converting a wireless signal in the mm-wave or sub-THz range into at least one modulated optical signal.

FIG. 1a shows a first embodiment of an electronic device 1 for converting a wireless signal in the mm-wave or sub-THz range into at least one modulated optical signal. The electronic device 1 receives a wireless signal 2 and converts the wireless signal into at least one modulated optical signal 16, which can be transmitted by at least one optical fibre 3. FIG. 1a illustrates the case of one modulated optical signal 16 and one optical fibre 3. The wireless signal 2 is in the mm-wave or sub-THz range. According to the embodiment illustrated in FIG. 1a, at least one antenna elements 11, an electrical signal converter 13 and at least one modulator 15 are arranged on a single integrated chip 10. The at least one modulator 15 according to FIG. 1a includes one modulator. As illustrated in FIG. 1a, the single integrated chip 10 may be enclosed in a microchip package 100. The at least one antenna element 11 may include a number N of antenna elements. The at least one antenna element 11 may comprise one, two, four, eight, sixteen, twenty-five, thirty-six, or any other number of antenna elements The at least one antenna element 11 according to FIG. 1a includes N=4 antenna elements. The at least one antenna element 11 converts the wireless signal into at least one guided electrical signal 12. Preferably, the number of guided electrical signals equals the number of antenna elements. The at least one guided electrical signal 12 according to FIG. 1a includes N=4 guided electrical signals. The electrical signal converter 13 is configured to receive the at least one guided signal 12 and to convert the at least one guided signal 12 into at least one conditioned electrical signal 14. The at least one conditioned electrical signal 14 according to FIG. 1 includes one conditioned electrical signal. The at least one modulator 15 is configured to receive the at least one conditioned electrical signal 14 and to convert the at least one conditioned electrical signal into the at least one modulated optical signal 16, which can be transmitted via at least one optical fibre 3.

The at least one modulator 15 comprises a waveguide 151. The at least one modulator 15 comprises a cladding 152. The cladding 152 comprises a first cladding portion having a conductive material at an interface with the waveguide 151. The cladding 152 comprises a second cladding portion having a conductive material at an interface with the waveguide 151. As illustrated in FIG. 1a, the at least one modulator 15 may include an optical interface 159 for receiving an externally generated optical signal and for transmitting the externally generated optical signal to the at least one modulator 15, in particular to the waveguide 151 In another variant, which is not illustrated in FIG. 1a, instead of receiving an externally generated optical signal, the at least one modulator 15 includes a generator which is configured to generate a respective optical signal.

Figure 1B:
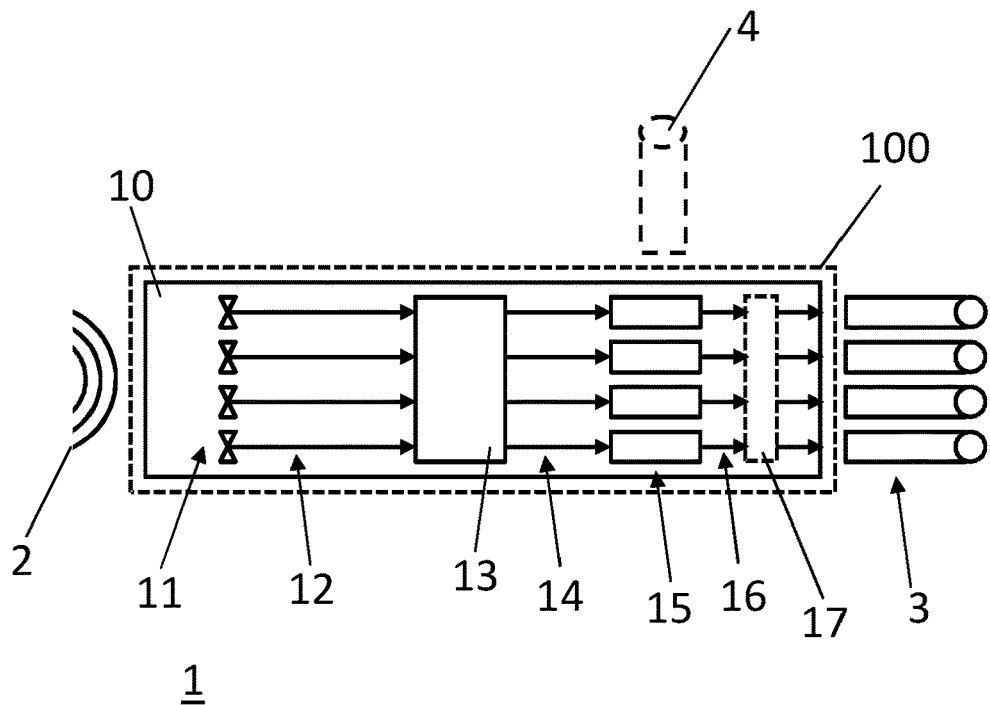
FIG. 1b schematically illustrates a second embodiment of an electronic device for converting a wireless signal in the mm-wave or sub-THz range into at least one modulated optical signal.

FIG. 1b schematically shows a second embodiment of an electronic device 1 for converting a wireless signal in the mm-wave or sub-THz range into at least one modulated optical signal 16. The electronic device 1 includes at least one antenna element 11, an electric signal converter 13, and at least one modulator 15 having the functions as described above in connection with FIG. 1a. As illustrated in FIG. 1b, the at least one antenna element 11 respectively the at least one guided electrical signal 12 include a number N=4 antenna elements respectively guided electrical signals. As illustrated in FIG. 1b, the at least one guided electrical signal 12 respectively the at least one modulator 15 includes a number M=4 guided electrical signals respectively modulators. In some embodiments of the electronic device 1, the number N may be two, four, eight, sixteen or any other number. In some embodiments of the electronic device the number M may be two, four, eight, sixteen or any other number.

As illustrated in FIG. 1b, the electronic device 1 may include an optical signal converter 17. The optical signal converter 17 may be configured to combine at least two modulated optical signals of the at least one modulated optical signal 16 in case of M>2. In the embodiment illustrated in FIG. 1, the optical signal converter 17 does not combine modulated optical signals. The optical signal converter 17 may be configured to delay/filter one or more of the modulated optical signals of the at least one modulated optical signal 16. Delaying of modulated optical signals may have the effect of beamforming. In some embodiments, the optical signal converter 17 is included in the at least one modulator 15.

Figure 2:
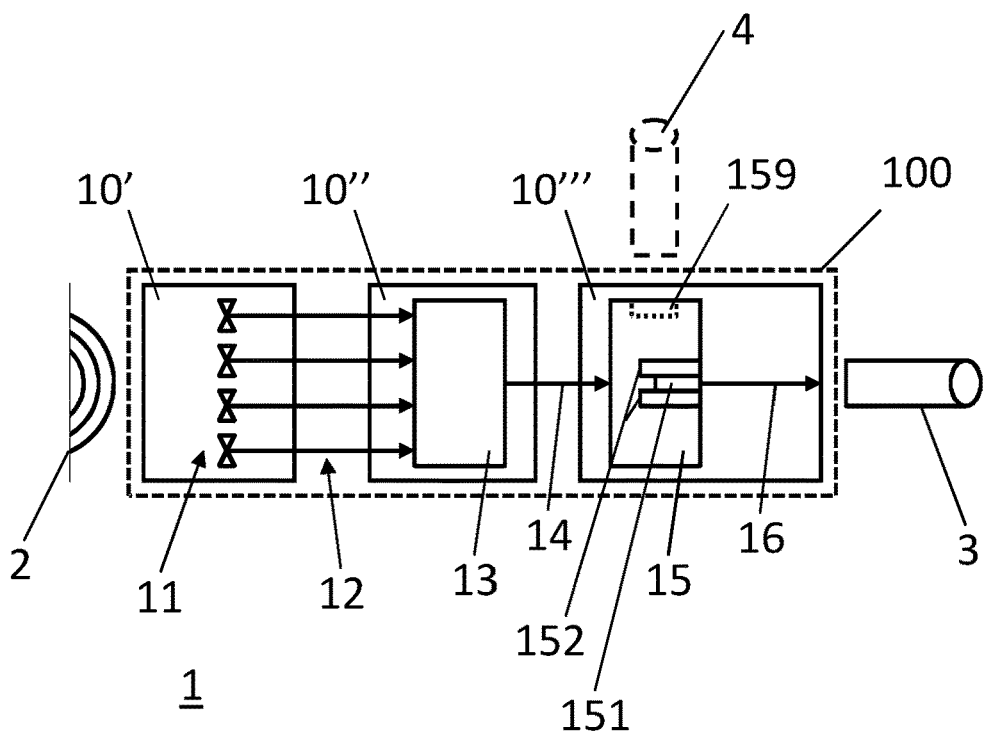
FIG. 2 schematically illustrates a third embodiment of an electronic device for converting a wireless signal in the mm-wave or sub-THz range into at least one modulated optical signal.

FIG. 2 schematically shows a third embodiment of an electronic device 1 for converting a wireless signal in the mm-wave or sub-THz range into at least one modulated optical signal 16. The electronic device 1 includes a first integrated chip 10' having arranged at least one antenna element 11. The electronic device 1 includes a second integrated chip 10" having arranged an electrical signal convertor 13. The electronic device 1 includes a third integrated chip 10'" having arranged at least one modulator 15. The at least one antenna element 11, the electrical signal convertor 13 and the at least one modulator 15 may be identical to the respective elements of the first embodiment of the electronic device 1 described in connection with FIG. 1a or FIG. 1b. As illustrated in FIG. 2, the first integrated chip 10', the second integrated chip 10" and the third integrated chip 10'" may be enclosed in a microchip package 100. In some embodiments, the optical signal converter 17 is included in the third integrated chip 10". In other embodiments, the optical signal converter 17 is included in a fourth integrated chip (not illustrated in the figures). In some embodiments, the fourth integrated chip is bonded to the third integrated chip 10".

In a fourth embodiment, which is not illustrated in FIG. 1a or FIG. 1b or FIG. 2, the at least one antenna element 11 and the electrical signal convertor 13 may be arranged on a single integrated chip, and the at least one modulator 15 may be arranged on another single integrated chip.

In a fifth embodiment, which is not illustrated in FIG. 1a or FIG. 1b or FIG. 2, the at least one antenna element 11 may be arranged on a single chip or on a printed circuit board, and the electrical signal convertor 13 and the at least one modulator 15 may be arranged on another single integrated chip.

The present disclosure does not concern an electronic device 1 without a signal convertor 13.

In the fourth and/or fifth embodiment, the at least one antenna element 11, the electrical signal convertor 13 and the at least one modulator 15 may be identical to the respective elements of the first or the second or the third embodiment described in connection with FIG. 1a or FIG. 1b or FIG. 2. In the fourth and/or fifth embodiment, the integrated chips may be enclosed in a microchip package.

In some embodiments, the at least one antenna element 11 includes N different antenna elements and each one of the N different antenna elements converts the wireless signal 2 into a guided electrical signal, such that the at least one guided electrical signal 12 includes N guided electrical signals.

In some embodiment, the electrical signal converter 13 includes a signal combiner for combining at least two guided electrical signals of the at least one guided electrical signal 12. The signal combiner may be configured to combine at least two guided electrical signals in a manner enabling an amplified and/or filtered at least one conditioned electrical signal 14.

In some embodiments, the signal combiner includes one or more delay lines for delaying one or more of the guided electrical signals of the at least one guided electrical signal 12. The one or more delay lines may be configured to enable an amplified and/or filtered at least one conditioned electrical signal 14. The one or more delay lines may be configured to enable beamforming techniques, for example as regards the wireless signal 2.

In some embodiments, the electrical signal converter 13 comprises an electrical amplifier and/or an electrical filter. The electrical amplifier and/or electrical filter may include integrated low-noise amplifiers, drivers, resistors, capacitors, inductors, switches, transmission lines, impedance matching networks, etc.

In some embodiments, the electrical signal converter 13 comprises a frequency converter which is configured such that the electrical signal converter 13 receives the at least one guided electrical signal 12 having a first frequency and transmits the at least one conditioned electrical signal 14 having a second frequency different from the first frequency. The electrical signal converter may include a mixer, etc. Frequency conversion may apply to one or more conditioned signals of the at least one conditioned electrical signal 14.

Figure 3A:
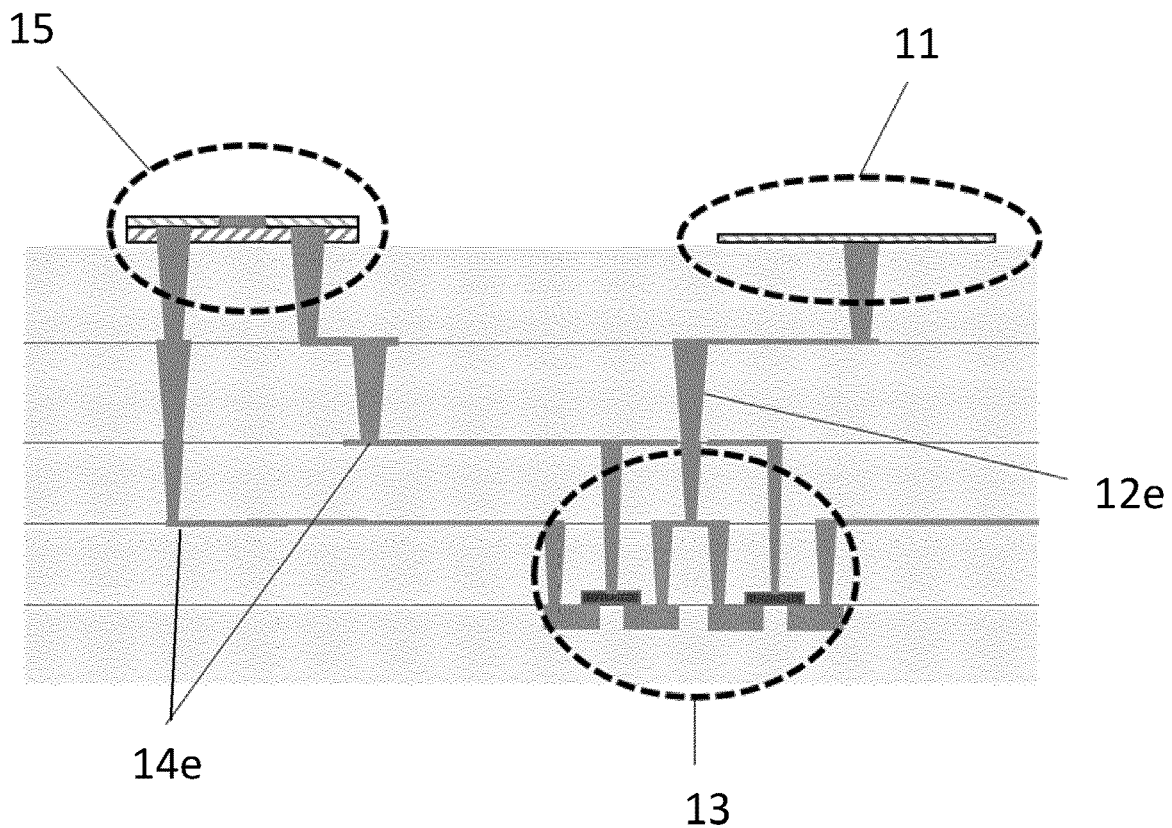
FIG. 3a, 3b, 3c, 3d schematically illustrate embodiments or aspects of embodiments of an electronic device for converting a wireless signal in the mm-wave or sub-THz range into at least one modulated optical signal.

FIG. 3a illustrates an embodiment of an electronic device for converting a wireless signal 2 in the mm-wave or sub-THz range into at least one modulated optical signal 16. The electronic device includes an integrated chip 10 having a substrate with several layers 101, 102, 103, 104, 105. As illustrated in FIG. 3a, at least one antenna element 11 may be located on top layer 105 of the substrate of the integrated chip 10. The at least one antenna element 11 is connected via electrical lines 12e to an electrical signal converter 13. The electrical signal converter 13 may have the form of an amplifier. For example, the amplifier is realized in the front-end of line (FEOL) of an employed fabrication process. As illustrated in FIG. 3a, the electrical signal converter 13 may be realized on intermediate layers 101, 102 of the substrate of a fabrication layer stack. The electrical signal converter 13 is connected via electrical lines 14e to at least one modulator 15. As illustrated in FIG. 3a, the at least one modulator 15 may be located on top layer 105 of the substrate of a fabrication layer. In some embodiments, which are not illustrated in FIG. 3a, the monolithically integrated single chip 10 includes a substrate having several substrate layers 101, 102, 103, 104, 105, wherein the antenna elements 11 are located in a first substrate layer, wherein the electrical signal converter 13 is located in a second substrate layer, and wherein the at least one modulator 15 is located in a third substrate layer.

Figure 3B:
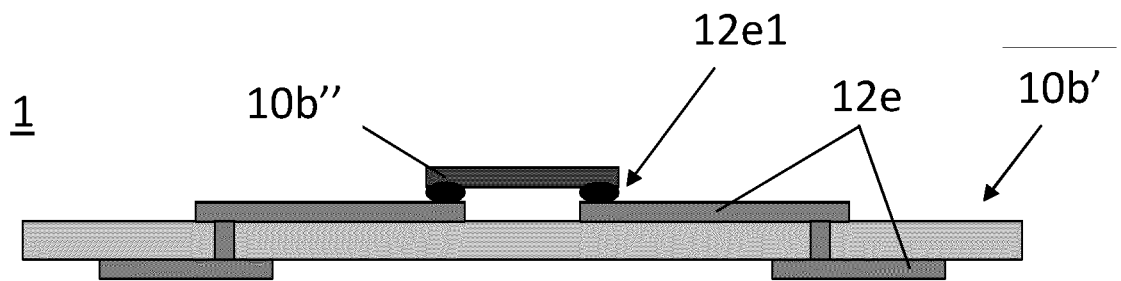
Figure 3C:
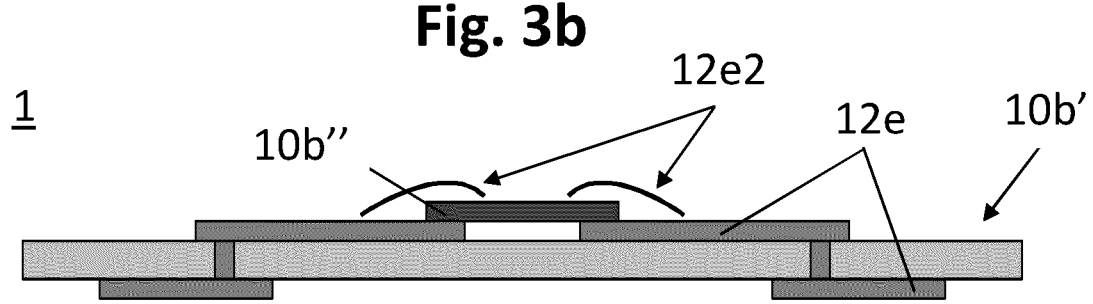

FIG. 3b and FIG. 3c illustrate schematically a cross section of an embodiment of an electronic device 1 for converting a wireless signal 2 in the mm-wave or sub-THz range into at least one modulated optical signal 16. The electronic device 1 has arranged at least one antenna element 11 (not shown in FIG. 3b) on a printed circuit board 10b' and an electrical signal converter 13 and at least one modulator 15 (not shown in FIG. 3b) on an integrated chip 10b". The printed circuit board 10b' includes electrical lines 12e which enable that the at least one guided electrical signal 12 converted by the at least one antenna element 11 is received by the electrical signal converter 13. As illustrated in FIG. 3b, the electrical lines 12e provide for a connection to the at least one antenna element 11 on one side of the printed circuit board 10b' and for a connection to the integrated chip 10b" on the other side of the printed circuit board 10b". FIG. 3b illustrates schematically an embodiment of an electronic device 1 with the integrated chip 10b" being connected to the electrical lines 12e via flip-chip bonding 12e1. FIG. 3c illustrates schematically an embodiment of an electronic device 1 with the integrated chip 10b" being connected to the electrical lines 12e via wire bonding 12e2.

Figure 3D:
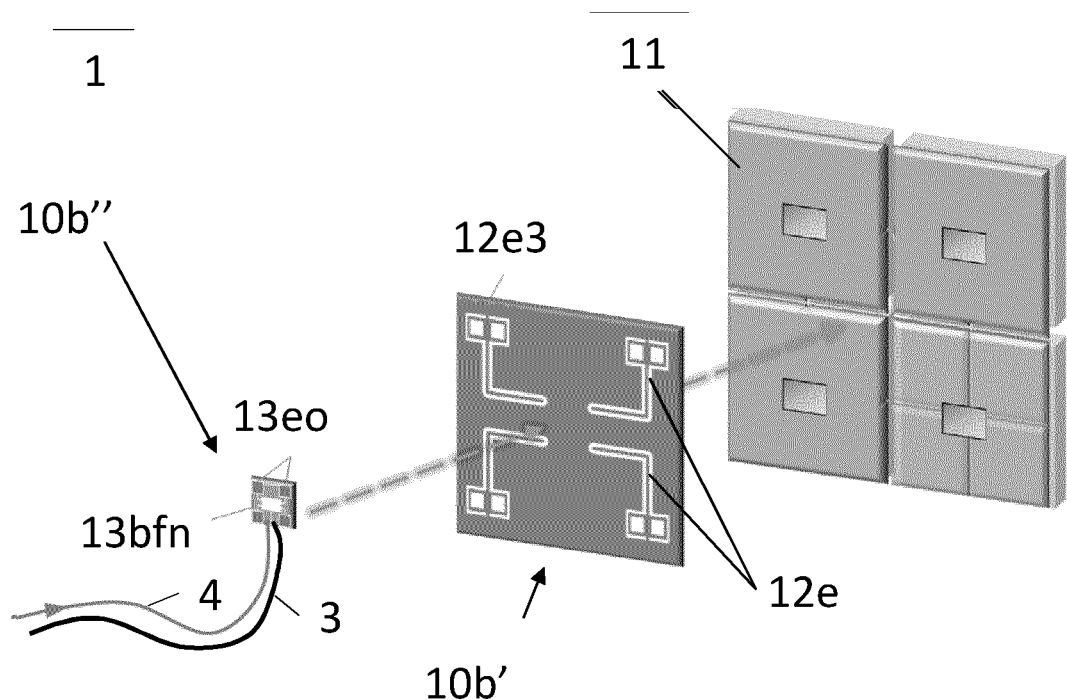

FIG. 3d illustrates schematically a perspective view of an embodiment of an electronic device 1 for converting a wireless signal 2 in the mm-wave or sub-THz range into at least one modulated optical signal 16. As illustrated in FIG. 3d, in some embodiments, an electrical-to-optical (E/O) converter 13eo, which may implement the at least one modulator 15, and/or a beamforming network 13bfn, which may implement functions of the optical signal converter 17, is included. In some embodiments, the at least one antenna element 11 includes a high-gain antenna array, in particular having a rectangular form of 2×2 antenna elements totalling to four antenna elements. In some embodiments, the printed circuit board 10b' includes a coplanar waveguide (CPW) to rectangular waveguide transition section 12e3, in particular for each of the antenna elements. As illustrated in FIG. 3d, the integrated chip 10b" is connected to optical fibre 4 for receiving an optical signal and to optical fibre 3 for transmitting a modulated optical signal. In some embodiments, the beamforming network 13bfn and/or the E/O converter 13eo is included in the electrical signal converter 13 and/or in the optical signal converter 17. In some embodiments, the beamforming network 13bfn is included in the at least one modulator 15.

Figure 4A:
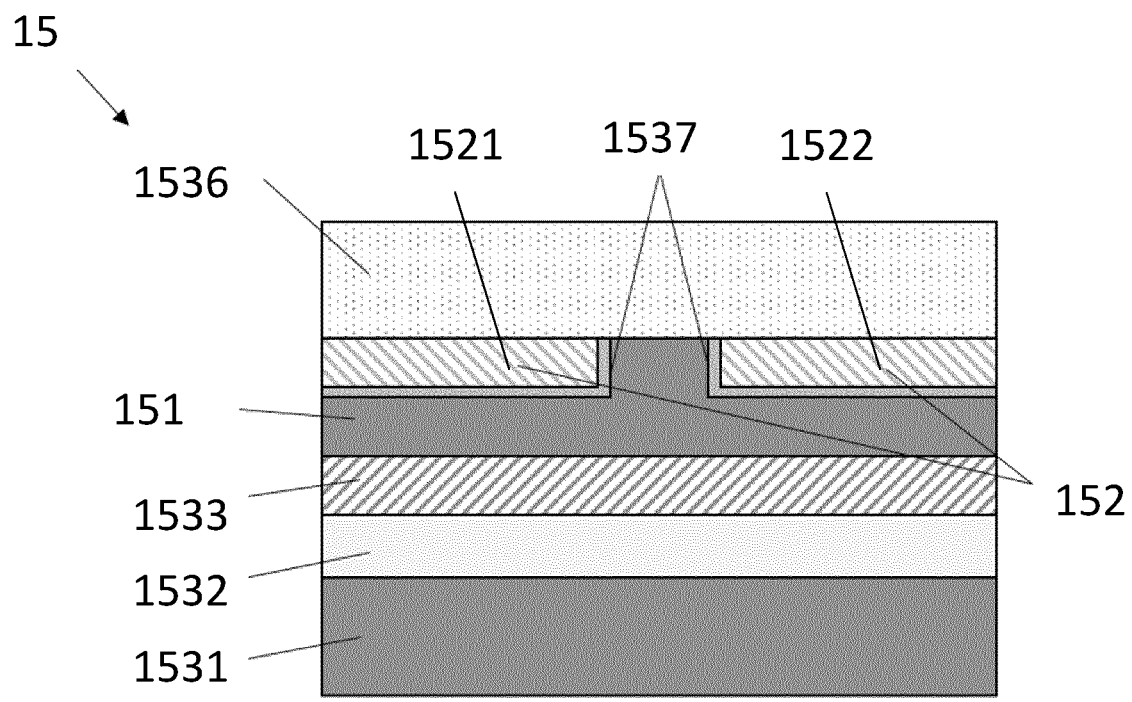
FIG. 4a, 4b, 4c schematically illustrate a cross section view of embodiments of a modulator.
Figure 4B:
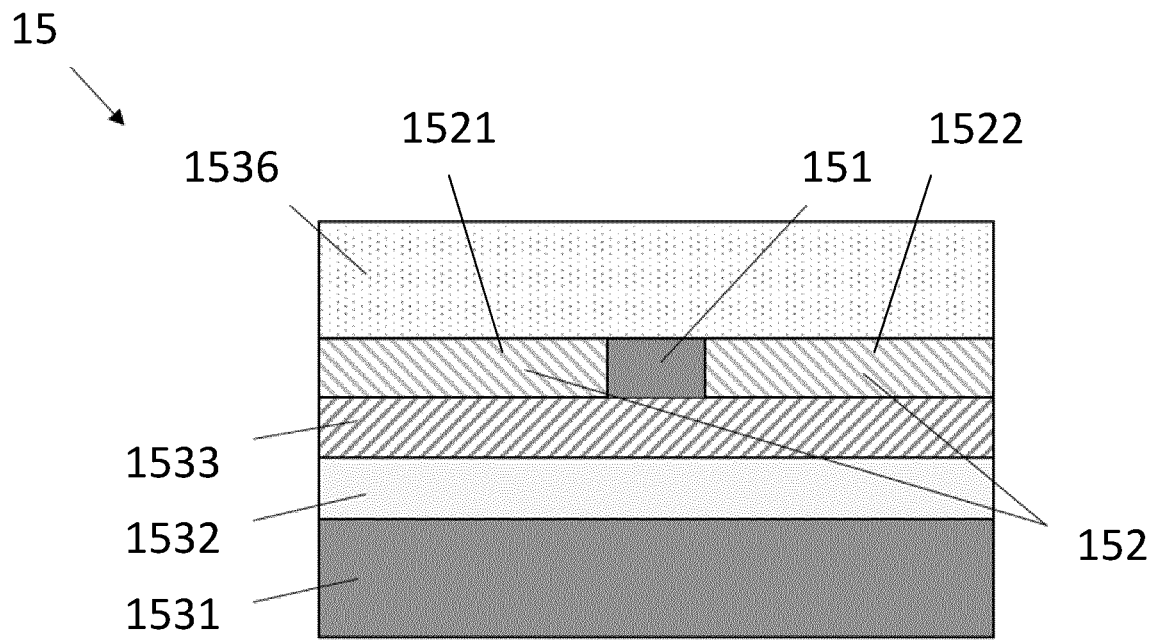
Figure 4C:
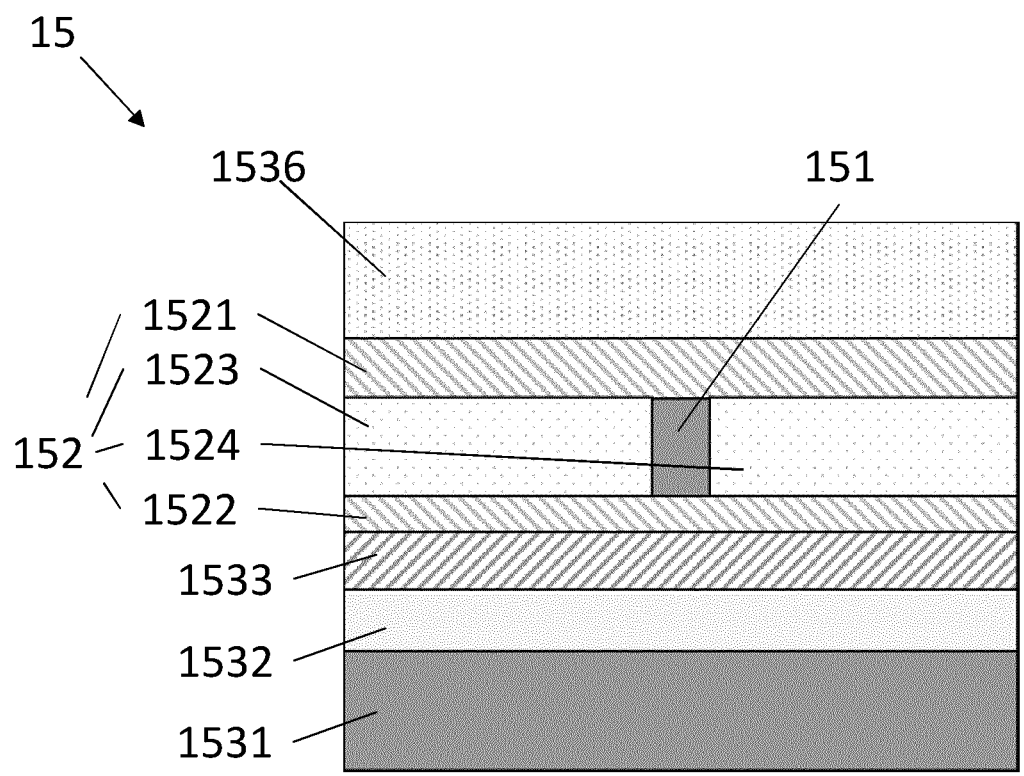

FIG. 4a, FIG. 4b and FIG. 4c illustrate schematically a cross section view of embodiments of a modulator of the at least one modulator 15. FIG. 4a illustrates a waveguide 151 in the form of a ridge waveguide. FIG. 4b and FIG. 4c illustrate a waveguide 151 in the form of a strip waveguide.

In some embodiments, the waveguide 151 of the modulator of the at least one modulator 15 includes a core comprising a nonlinear material, in particular a ferroelectric material. Thus, the modulator may be a ferroelectric modulator, such as a photonic or plasmonic ferroelectric modulator. The modulator may comprise a first and a second cladding portion 1521, 1522 in the form of a first and a second electrode for producing an electric field in the waveguide 151, e.g. in the ferroelectric material. The ferroelectric modulator may employ Pockels effect in a ferroelectric material. The ferroelectric material of the waveguide 151 may be any ferroelectric material, such as $LiNbO_3$, $KNO_3$, $KTa_xNb_{1-x}O_3$, $Ba_xSr_{1-x}TiO_3$, $SrBaNbO_3$, $K_3Li_2Nb_5O_{15}$, $K_xNa_{1-x}Sr_yBa_{1-y}$—$Nb_2O_6$, $KH_2PO_4$, $KH_2AsO_4$, $NH_4H_2PO_4$, $ND_4D_2PO_4$, $RbH_2AsO_4$, $KTiOPO_4$, $KTiOAsO_4$, $RbTiOPO_4$, $RbTiOAsO_4$, $CsTiOAsO_4$, $Pb(Zr_xTi_{1-x})O_3$, La-doped $Pb(Zr_xTi_{1-x})O_3$, $_{(1-x)}[Pb(Mg_{1/3}Nb_{2/3}O_3)_{-x}[PbTiO_3]$, or $_{(1-x)}[Pb(Zr_{1/3}Nb_{2/3}O_3)_{-x}[PbTiO_3]$, (0<x<1; 0<y<1.

The modulator of the at least one modulator 15 may comprise an 80 nm thick $BaTiO_3$ film on a substrate material 1531, e.g. an SOI wafer, but not limited thereto. Intermediate spacer layers 1537 may be present between the electrodes 1521, 1522 and the ferroelectric material of the waveguide 151.

In some embodiments, the modulator of the at least one modulator 15 comprises a waveguide 151, e.g. a ferroelectric material, that is bonded to a e.g. 3000 nm SiO2 layer 1532 grown e.g. on a resistive silicon wafer 1531, by means of adhesion layers 1533 for e.g. Al2O3, but not limited thereto. In other embodiments, the modulator 15 comprises a waveguide 151, e.g. a ferroelectric material, that is epitaxially grown on a crystalline substrate, with zero, one or more intermediate layers between the substrate and the ferroelectric material. In yet other embodiments, the modulator is realized using a polymer as waveguide 151, e.g. as nonlinear material. In yet other embodiments, the nonlinear material of the waveguide 151 is deposited using a spin-coating method. (Mention spin coating). In other embodiments, the modulator is realized using a waveguide 151 of a structured metallic material acting as a nonlinear medium, such as a grating (Miriam Gigli, Marina Inchaussandague, Claudio Valencia, and Eugenio Mendez, "Nonlinear electromagnetic response of corrugated metallic gratings," J. Opt. Soc. Am. B 28, 1940-1950 (2011)), a film (Ji Ping Huang and Kin Wah Yu, "Effective nonlinear optical properties of graded metal-dielectric composite films of anisotropic particles," J. Opt. Soc. Am. B 22, 1640-1647 (2005)), but not limited thereto.

In some embodiments, the at least one modulator 15 comprises a coating layer realized using e.g. air or $SiO_2$.

In some embodiments, both first and second modulator electrodes 1521, 1522 include a metal, such as Au, Ag, Cu, Al, TiN but not limited thereto. In other embodiments, only one or both modulator electrodes 1521, 1522 include a semi-metal, which may be any semi-metal, such as a highly doped semiconductor, e.g. ITO, ATO, highly doped Si, but not limited thereto.

As illustrated in FIG. 4b, in some embodiments, the modulator electrodes 1521, 1522 are located on the sides of the waveguide 151. FIG. 4b illustrates a modulator 15 in a horizontal "electrode-nonlinear material-electrode" configuration. FIG. 4c illustrates a modulator 15, wherein the modulator electrodes 1521, 1522 are located on the top and bottom of the nonlinear material, in a vertical "electrode-nonlinear material-electrode" configuration.

As illustrated in FIG. 4c, in some embodiments, a third cladding portion 1523 and a fourth cladding portion 1524 are arranged on opposite sides of the waveguide 151. The waveguide 151 and the third and fourth cladding portions 1523, 1524 are arranged between the modulator electrodes 1521, 1522, namely the first and second cladding portions 1521, 1522.

The third and fourth cladding portions 1523 and 1524 may provide horizontal confinement to the electric field in the waveguide 151.

An spacer layer 1537 may be present, having a lower refractive index than the nonlinear material of the waveguide 151, providing an additional horizontal confinement to the electric field of the surface plasmon polariton. The spacer layer 1537 may have the property of an insulating layer and/or of an adhesive layer.

Figure 5:
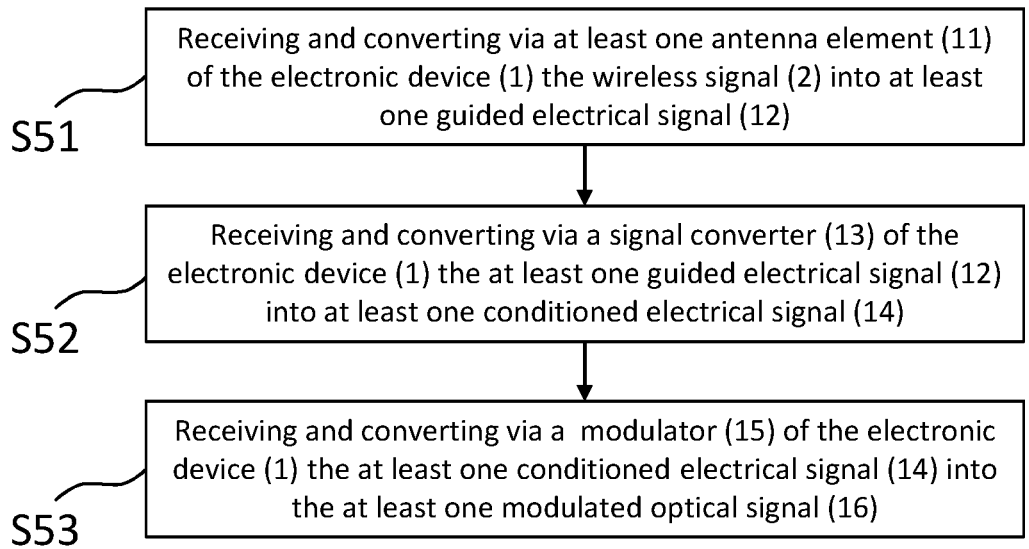
FIG. 5 schematically illustrates a flow diagram of a method of converting a wireless signal in the mm-wave or sub-THz range into at least one modulated optical signal.

FIG. 5 illustrates schematically a flow diagram of a method of converting a wireless signal 2 in the mm-wave or sub-THz range into at least one modulated optical signal 16, wherein an electronic device 1 according to one of the embodiments described above is provided. In step S51, the wireless signal 2 is received and converted via at least one antenna element 11 of the electronic device into at least one guided electrical signal. In step S52, the at least one guided electrical signal 12 is received and converted via an electrical signal converter 13 of the electronic device 1 into at least one conditioned electrical signal 14. In step S53, the conditioned electrical signal 14 is received and converted via at least one modulator 15 of the electronic device into the at least one modulated optical signal 16.

Figure 6:
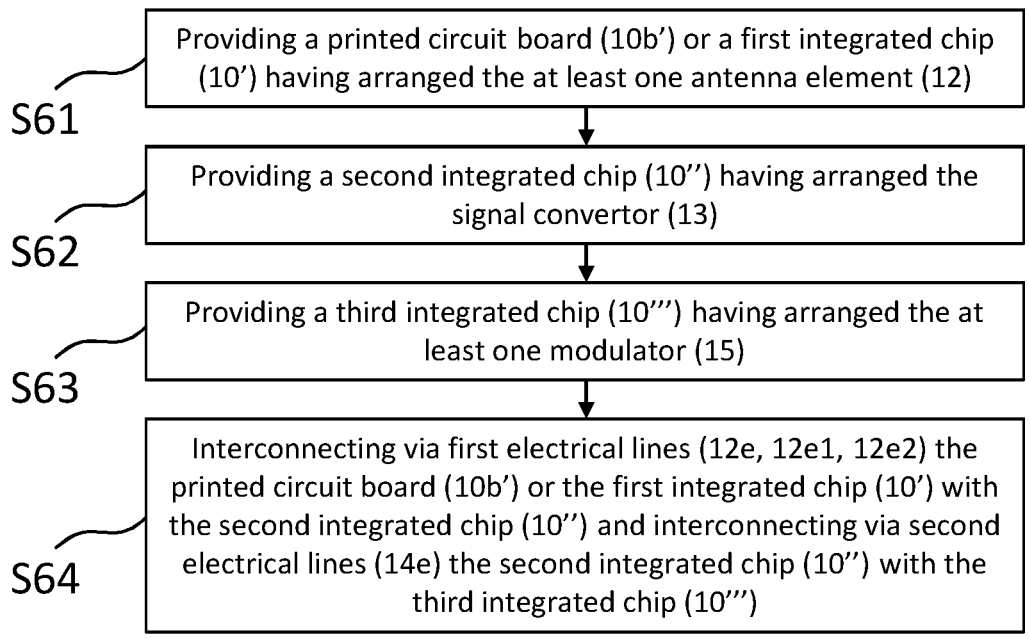
FIG. 6 schematically illustrates a flow diagram of a method of manufacturing an electronic device for converting a wireless signal in the mm-wave or sub-THz range into at least one modulated optical signal.

FIG. 6 illustrates schematically a method of manufacturing an electronic device for converting a wireless signal 2 in the mm-wave or sub-THz range into at least one modulated optical signal 16 according to some embodiments as described above. In step S61, a printed circuit board 10b' or a first integrated chip 10' having arranged the at least one antenna element 12 is provided. In step S62, a second integrated chip 10" having arranged the electrical signal converter 13 is provided. In step S63, s third integrated chip 10''' having arranged the at least one modulator 15 is provided. In step S64, via first electrical lines 12e, 12e1, 12e2 the printed circuit board 10b' or the first integrated chip 10' is interconnected with the second integrated chip 10" and via second electrical lines 14e the second integrated chip 10" is interconnected with the third integrated chip 10'''. In some embodiments, the at least one antenna element 11 is fabricated by means of chemical or laser etching of a radio-frequency printed circuit board (e.g. Rogers 300x substrate). In some embodiments, electrical lines 12e in the form of transmission lines feeding the single antenna elements 11 are also realized by the same method. In some embodiments, the second integrated chip 10" and third integrated chip 10''' are connected to the first integrated chip 10' or the printed circuit board 10b' by means of flip-chip bonds 12e1 or wire bonds 12e2.

LIST OF REFERENCE SIGNS

1 electronic device for converting a wireless signal into at least one modulated signal
2 wireless signal
10 monolithically integrated chip; 10', 10", 10''' first, second and third integrated chip
11 at least one antenna element
12 at least one guided electrical signal 12e, 12e1, 12e2, 12e3 first electrical lines for guiding the at least one guided electrical signal including flip-chip bonding 12e1, wire bonding 12e2,
13 electrical signal convertor
13eo, 13bfn E/O converter, beam forming network of electrical signal convertor
14 at least one conditioned electrical signal
14e second electrical lines for transmitting the conditioned electrical signal
15 at least one modulator
151 waveguide
152 cladding
159 optical interface of the at least one modulator
16 at least one modulated optical signal
17 optical signal converter
3 at least one optical fibre for transmitting the at least one modulated optical signal
4 optical fibre for receiving an externally generated optical signal

The invention claimed is:

1. An electronic device for converting a wireless signal in an mm-wave or sub-THz range into at least one modulated optical signal, the electronic device comprising:
   at least one antenna element for receiving the wireless signal and for converting the wireless signal into at least one guided electrical signal, wherein the at least one antenna element is arranged on a printed circuit board or on a first integrated chip;
   an electrical signal converter for receiving the at least one guided electrical signal and for converting the at least one guided electrical signal into at least one conditioned electrical signal, wherein the electrical signal converter is arranged on a second integrated chip; and
   at least one modulator for receiving the at least one conditioned electrical signal and for converting the at least one conditioned electrical signal into the at least one modulated optical signal, wherein the at least one modulator is arranged on a third integrated chip, wherein the at least one modulator comprises a waveguide, wherein the at least one modulator comprises a cladding, wherein the cladding comprises a first cladding portion having a first conductive material at a first interface with the waveguide, and wherein the cladding comprises a second cladding portion having a second conductive material at a second interface with the waveguide.

2. The electronic device of claim 1, wherein the at least one antenna element includes a number N of different antenna elements, wherein each one of the N antenna elements converts the wireless signal into a guided electrical signal, wherein the at least one guided electrical signal includes a number N of guided electrical signals.

3. The electronic device of claim 1, wherein the at least one conditioned electrical signal includes a number M of conditioned electrical signals.

4. The electronic device of claim 1, wherein the at least one optical modulator includes a number M of modulators and the at least one modulated optical signal includes a number M of modulated optical signals.

5. The electronic device of claim 1, further comprising an optical signal converter configured to combine at least two of the number M of modulated optical signals and/or to delay/filter one or more of the number M of modulated optical signals.

6. The electronic device of claim 2, wherein the electrical signal converter is configured to combine at least two of the number N of guided electrical signals and/or to delay one or more of the number N of guided electrical signals.

7. The electronic device of claim 1, wherein the electrical signal converter comprises one or more of an electrical amplifier and an electrical filter.

8. The electronic device of claim 1, wherein the electrical signal converter comprises a frequency converter, wherein the at least one guided electrical signal has a first frequency, and wherein one or more conditioned electrical signals of the at least one conditioned electrical signal has a second frequency different from the first frequency.

9. The electronic device of claim 1, wherein the waveguide of the at least one modulator includes a core comprising a nonlinear material, in particular, one or more of a ferroelectric material and a polymer material.

10. The electronic device of claim 1, further comprising an optical interface for receiving and transmitting an externally generated optical signal to the at least one modulator.

11. The electronic device of claim 1, wherein two or more of the first, second and third integrated chips are included in a monolithically integrated single chip, in particular, based on a monolithic integration including one of: epitaxial growth, wafer bonding, or flip-chip bonding.

12. The electronic device of claim 1, wherein the third integrated chip includes a substrate having one or more substrate layers, and wherein the waveguide is located on one of the substrate layers and attached to it.

13. The electronic device of claim 1, wherein the first cladding portion is spaced apart from the second cladding portion and arranged on one side of the waveguide.

14. The electronic device of claim 1, wherein the first cladding portion and the second cladding portion are arranged on opposite sides of the waveguide.

15. The electronic device of claim 1, wherein the cladding includes a third cladding portion and a fourth cladding portion, wherein the third and fourth cladding portions are arranged on opposite sides of the waveguide, and wherein the waveguide and the third and fourth cladding portions are arranged between the first and second cladding portion.

16. The electronic device of claim 1, wherein a spacer layer is arranged between the waveguide and the first and/or the second cladding portion.

17. The electronic device of claim 1, wherein one or more of the first, second and third integrated chip or the monolithically integrated single chip is/are enclosed in a microchip package.

18. A method of converting a wireless signal in the mm-wave or sub-THz range into at least one modulated optical signal, wherein an electronic device according to claim 1 is provided, the method comprising:
   receiving and converting via at least one antenna element of the electronic device the wireless signal into at least one guided electrical signal;
   receiving and converting via an electrical signal converter of the electronic device the at least one guided electrical signal into at least one conditioned electrical signal; and
   receiving and converting via at least one modulator of the electronic device the at least one conditioned electrical signal into the at least one modulated optical signal.

19. A method of manufacturing an electronic device for converting a wireless signal in the mm-wave or sub-THz range into at least one modulated optical signal according to claim 1, the method comprising:
   providing a printed circuit board or a first integrated chip having arranged the at least one antenna element;

providing a second integrated chip having arranged the electrical signal convertor;
providing a third integrated chip having arranged the at least one modulator;
interconnecting via first electrical lines the printed circuit board or the first integrated chip with the second integrated chip and interconnecting via second electrical lines the second integrated chip with the third integrated chip.

20. The electronic device of claim 1, wherein the first interface and the second interface are separated by the waveguide.

21. The electronic device of claim 20, wherein the first interface and the second interface are arranged side-by-side.

22. An electronic device for converting a wireless signal in an mm-wave or sub-THz range into at least one modulated optical signal, the electronic device comprising:
at least one antenna element for receiving the wireless signal and for converting the wireless signal into at least one guided electrical signal, wherein the at least one antenna element is arranged on a printed circuit board or on a first integrated chip;
an electrical signal converter for receiving the at least one guided electrical signal and for converting the at least one guided electrical signal into at least one conditioned electrical signal, wherein the electrical signal converter is arranged on a second integrated chip; and
at least one modulator for receiving the at least one conditioned electrical signal and for converting the at least one conditioned electrical signal into the at least one modulated optical signal, wherein the at least one modulator is arranged on a third integrated chip, wherein the at least one modulator comprises a waveguide, wherein the at least one modulator comprises a cladding, wherein the cladding comprises a first cladding portion having a first conductive material at an interface with the waveguide, and wherein the cladding comprises a second cladding portion having a second conductive material at an interface with the waveguide,
wherein two or more of the first, second and third integrated chips are included in a monolithically integrated single chip, in particular, based on a monolithic integration including one of: epitaxial growth, wafer bonding, or flip-chip bonding, and
wherein the monolithically integrated single chip includes a substrate having several substrate layers, wherein the at least one antenna element is located on a first substrate layer, wherein the at least one electrical signal converter is located on a second substrate layer, and wherein the at least one modulator is located on a third substrate layer.

* * * * *